Figures 1, 2:
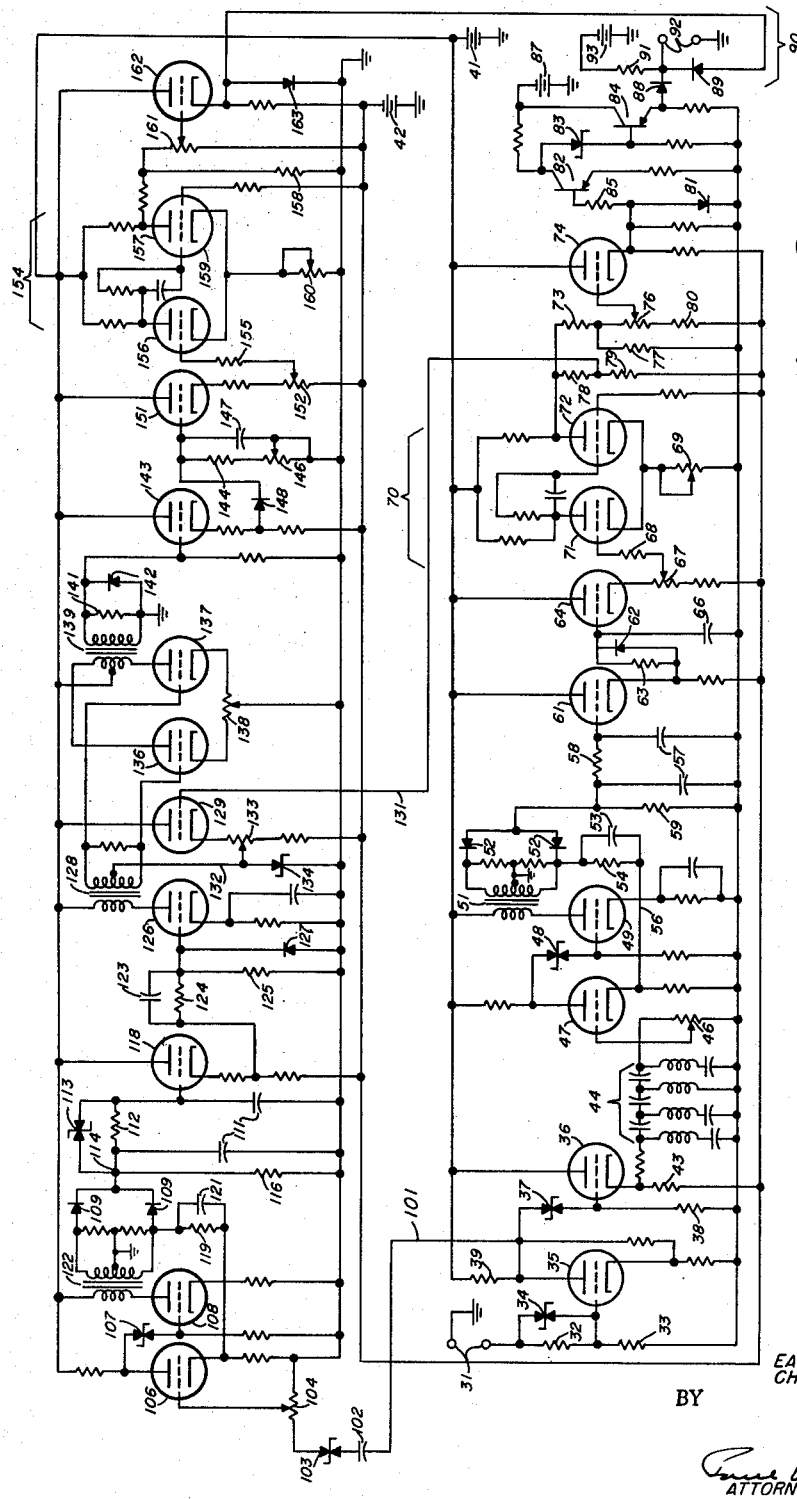

Sept. 1, 1964  E. G. HEDGER ETAL  3,147,438
SIGNAL-TO-NOISE RATIO SENSOR FOR FREQUENCY MODULATION RECEIVER
Filed June 28, 1961

INVENTORS
EARL G. HEDGER
CHARLES G. WILHELM
BY
ATTORNEYS

United States Patent Office 3,147,438
Patented Sept. 1, 1964

3,147,438
SIGNAL-TO-NOISE RATIO SENSOR FOR FREQUENCY MODULATION RECEIVER
Earl G. Hedger and Charles G. Wilhelm, San Diego, Calif., assignors to the United States of America as represented by the Secretary of the Navy
Filed June 28, 1961, Ser. No. 120,449
7 Claims. (Cl. 325—363)
(Granted under Title 35, U.S. Code (1952), sec. 266)

The invention described herein may be manufactured and used by or for the Government of the United States of America for governmental purposes without the payment of any royalties thereon or therefor.

The invention relates to a system for monitoring noise, and more particularly to a system for monitoring noise in a frequency-modulation system.

In communication systems a meter is sometimes placed in one of the amplifier stages to measure the signal strength; for example, in communication receivers a meter may be placed across a grid resistor of an electron tube used as an intermediate-frequency amplifier. The signal measured at this point may be modulated in a number of undesired ways and the signal may include white noise, adjacent channel noise, atmospheric noise, co-channel noise and impulsive noise. The meter of course has no way of discerning what portion of the measured signal constitutes wanted signal and what portion constitutes undesired signal, that is noise.

Attempts have been made to use such a type of monitoring in a burst-type communication system wherein no bursts are transmitted until a monitored ready-to-receive signal, sent by the communicant, is found to reach or exceed a certain amplitude level. This procedure is unsatisfactory as once the level is reached or exceeded the burst is transmitted, regardless of the ratio of monitored signal to noise. Burst transmissions can be sent erroneously when nothing is received except noise and they can also be sent when the ready-to-receive signal has a poor ratio with respect to noise. If the level, which the ready-to-receive signal must reach before the burst is transmitted, is raised in an attempt to allow for the presence of noise in with the desired signal, the duty cycle is necessarily lowered and bursts may still be transmitted under adverse transmission conditions.

It is an object of this invention to provide a system for sensing unwanted noise signals in a frequency-modulation system.

It is an object of this invention to provide a system which can readily distinguish a wanted signal from impulse signals, co-channel interference signals and other interfering signals in a frequency-modulation system.

These and other objects of the invention will be apparent from, and will be referred to in, the following description in conjunction with the drawings in which:

FIG. 1 shows in block diagram an embodiment of a noise monitoring system according to the invention; and FIG. 2 is a schematic diagram of circuitry applicable in apparatus according to FIG. 1.

In the embodiment of the invention illustrated in FIG. 1 an input 31 is adapted for coupling to the output of a frequency-modulation detector of a communication system employing a carrier having fixed frequency deviation. The detector may be, for example, a Foster-Seeley discriminator employed in an FM receiver.

Probably the most salient feature of a frequency-modulation system is its noise-suppressing property. This undoubtedly prompted Major Armstrong to label his original paper on frequency modulation, given in 1935, "A Method of Reducing Disturbances in Radio Signalling by a System of Frequency Modulation."

When an interfering signal is added to a desired carrier signal a resultant signal is produced having unwanted amplitude and frequency variations. A frequency-modulation system is adapted to effectively cope with such an interfering signal. The limiter stages in a frequency-demodulation system, such as an FM receiver, remove the amplitude variations. The effect of the frequency variations can be minimized by employing a large frequency swing in the transmitter. The ratio of wanted carrier signal to interfering signal measured before the frequency-modulation detector is usually not the same ratio as found at the output of the detector. The signal-to-noise ratio at the output of the frequency-modulation detector is found by dividing the frequency deviation of the wanted carrier signal with that deviation caused by the interfering signal. The ratio of signal amplitudes at the input of the detector will affect the ratio of deviations but the two ratios will not necessarily be the same. The greater the wanted carrier signal amplitude with respect to the amplitude of the interfering signal, at the detector input, the greater will be the signal-to-noise ratio at the detector output. When the amplitude of the wanted carrier is twice that of the interfering signal the ratio of wanted signal to interfering signal at the output of the frequency-modulation detector could be, for example, one thousand to one.

The noise-suppressing properties of frequency modulation apply when the wanted carrier signal level at the frequency-modulation detector is greater than the noise level. When the noise level exceeds the wanted carrier signal level, the noise suppresses the signal. The noise-suppressing phenomenon is known as quieting. A detailed explanation of the noise-suppressing properties of frequency modulation may be found in pages 20–28 of "Standard FM Handbook" edited by Milton B. Sleeper, published by FM Company, Great Barrington, Massachusetts (1946).

Referring again to the block diagram in FIG. 1, the output from the frequency-modulation detector is split off into two separate channels, Channel A and Channel B after amplification. The outputs of the two channels feed into an AND gate 90. Channels A and B have binary outputs, the output at any moment of operation is either a "1" or a "0." Channel A filters out the majority of the modulation on the carrier of the desired signal and examines the remainder. As the carrier of the desired signal has a fixed frequency deviation, the desired signal produces a signal of constant amplitude at input 31. All unwanted signals, if any, are included with the desired signal at input 31. Channel A filters out the majority of the desired signal so that the remaining heterogeneous signals remain as noise. When the noise exceeds a preset level the channel produces a "1" output. At all other times of operation the output of Channel A is a "0."

Channel B is connected to input 31 by connection 101. Channel B normally produces a "0" output. When impulse noise is recognized the output switches to a "1." If pulses of noise reach a certain repetition rate, the output may remain a constant "1." Lead 131 from Channel A prevents Channel B from producing a "1" output when Channel A produces a "1" output. The output of negative AND gate 90 is only "0" when the output of both channels is "0." It is "1" at all other times. The switching voltage from the AND gate is indicative of the noise at input 31. The switch voltage may be used for any of a number of control purposes, for example, it may control an indicator such as a neon bulb; it may switch a recorder which is recording the desired signal; or it may control a transmitter adapted to return a signal to the source of the desired signal as soon as the noise subsides.

FIG. 2 illustrates schematically circuitry applicable in apparatus according to FIG. 1. The desired signal, a frequency-modulated signal having fixed-frequency deviation, is detected in a frequency demodulator, not shown. The demodulator may be, for example, a Foster-Seeley discriminator. The output of the demodulator is connected to input terminals 31. Due to the above-mentioned phenomenon, quieting, unwanted signals (noise) appearing at input terminals 31 may drop in amplitude pronouncedly when the desired signal is detected. This, of course, will depend on the amplitude of the desired signal as explained above. As the desired signal is a frequency-modulated carrier with fixed-frequency deviation it will produce a signal of constant amplitude at the demodulator output, terminals 31. Undesired signals such as atmospheric noise, white noise, impulse noise, adjacent channel signals and co-channel signals, if present, will add to the desired signal. The signals imposed on terminals 31 are fed across series-connected resistors 32 and 33. A double-ended (double-anode) Zener diode 34 is in parallel with resistor 32. The avalanche value of Zener diode 34 is selected so that no breakdown will occur unless unwanted signals are combined with the desired signal. The resistance of resistor 33 is preferably one-tenth that of resistor 32 so that the full amplitude of the signals on terminals 31 is not seen by the grid of electron tube 35 unless the Zener diode breaks down. The plate of tube 35 is connected to power supply 41 by means of resistor 39. Power supply 41 furnishes the plate voltage for all the tubes in the circuit. Tube 35 slightly amplifies the signals imposed on its grid. The amplified output signals are D.-C. coupled to tube 36 by means of double-ended Zener diode 37. The breakdown voltage of the diode is chosen to provide the desired bias voltage on the grid of tube 36. Resistor 38 insures the immediate and continued breakdown of the diode as soon as power supply 41 is turned on. The diode provides a constant voltage drop and does not attenuate the output signals from the tube 35. Tube 36 is connected as a cathode follower to provide the proper input impedance for high-pass filter 44 and to isolate the filter from the first amplifier stage. In order to accommodate negative signals of high amplitude on the grid without the effects of cut-off limiting, the lower end of cathode resistor 43 of tube 36 is kept at a negative potential by power supply 42. The cathode resistors used in other cathode followers in the system are treated in a similar manner. Filter 44 has a cut-off frequency that is equal to the fifth harmonic of the highest frequency of the desired signal (the demodulated desired signal of course) so that the major portion of the desired signal is impeded and the heterogeneous or miscellaneous signals which pass the filter are mostly undesired signals (noise). The output of the filter is placed across potentiometer 46. The wiper of the potentiometer is connected to the grid of electron tube 47 which functions as an amplifier and serves to amplify the output signals from high-pass filter 44. The level of the signals imposed on the grid of tube 47 may be varied by varying the position of wiper 46. Tube 47 is D.-C. coupled to tube 49 by means of double-ended Zener diode 48. Tube 49 amplifies the output signals from tube 47. The signals amplified by electron tube 49 are rectified in the full-wave rectifier circuit including transformer 51 and diodes 52. Shunt-connected capacitor 53 and resistor 54 are coupled between the transformer secondary winding and the cathode of tube 47 to provide a path of negative-feedback signals to tube 47. The anodes of the diodes are connected together so that the output of the rectifier will become more negative with respect to ground as more noise is rectified. The rectifier output signals are smoothed by a pi-connected filter consisting of capacitors 57 and resistor 58. Resistor 59 acts as a bleeder resistor since it always tries to discharge the voltage accumulated on the capacitors. The smoothing filter output signals are fed into electron tube 61 which acts as a cathode follower. Capacitor 66 and resistor 63 integrate the signals emitted by the cathode follower and provide additional smoothing of the rectifier output signals. Diode 62 is connected in shunt with resistor 63. The diode is oriented with its anode connected to the cathode of tube 61 so that it will not conduct unless the grid of tube 64 is more negative than the cathode of tube 61. When noise signals are rectified, the grid and cathode of tube 61 goes more negative, diode 62 fails to conduct and resistor 63 and capacitor 66 act as an integrator. When the noise subsides (due to quieting or otherwise), the output signals from the rectifier diminish, the grid and cathode of tube 61 go in a positive direction and diode 62 conducts. When diode 62 conducts resistor 63 is shorted and capacitor 66 is quickly discharged through the diode. The resistor-capacitor integrator is isolated from the next stage by a cathode follower stage employing tube 64. Potentiometer 67, placed in the cathode circuit of tube 64, controls the output level of the cathode follower. A conventional Schmitt trigger circuit 70 includes electron tubes 71 and 72. The Schmitt trigger circuit is D.-C. coupled to the cathode follower by means of resistor 68. The operation of a Schmitt trigger circuit resembles that of a single multivibrator with the exception that in the Schmitt both he leading and trailing edges of the generated pulse are timed by the triggering pulse. When the input voltage to a Schmitt trigger exceeds a first specific voltage a positive-going rectangular pulse is produced at the output of the circuit and the pulse exists until the input voltage drops below a second specific voltage which may or may not be the same as the first specific voltage. The variance in specific voltages is known as voltage hysteresis or backlash. In the instant circuit it is adjusted by means of potentiometer 69. When noise is absent in Channel A tube 71 conducts and cuts off tube 72. When noise signals appear in the channel, the cathode of tube 64 goes in the negative direction and so does the grid of tube 71. A point is finally reached which causes tube 71 to stop conducting. Tube 72 then begins to conduct and a negative-going pulse is produced on the plate of tube 72. Resistors 78 and 79 form a voltage-dropping network, the output of which is fed to Channel B by means of lead 131. The signals on 131, the reduced-amplitude output signals of the Schmitt trigger circuit 70, control the conduction of tube 129 which functions as a gated amplifier. The output signals of Schmitt trigger 70 are binary in nature like those of a flip-flop and they are D.-C. coupled to the grid of tube 74 by means of the voltage-dividing and level-adjusting network comprising resistors 73, 77 and 80 and potentiometer 76. The wiper of potentiometer is connected to electron tube 74 which is connected as a cathode follower and serves to isolate the Schmitt trigger circuit from the next stage, an inverter. Whenever the cathode of tube 74 becomes positive with respect to ground, diode 81 conducts and shorts out the output of the tube. The potential on the cathode of tube 74 becomes more positive when tube 71 conducts (noise is absent in the channel) and becomes more negative when tube 72 conducts (noise is present in the channel). The output of tube 74 is D.-C. coupled to PNP transistor 82 by means of resistor 82. The collector voltage for transistor 82 and PNP transistor 83 is provided by power supply 87. Transistor 82 is conected as a common-emitter amplifier and functions to amplify and invert the phase of the signals impressed on its base. The amplified and inverted signals from transistor 82 are coupled to transistor 84 by means of Zener diode 83. The breakdown voltage of Zener diode 83 is chosen so that the diode is constantly broken down when the circuit is energized. The voltage drop across the diode sets the D.-C. bias on the base of transistor 84. The collector of transistor 84 is connected directly to power supply 87. The transistor functions as an emitter follower and outgoing signals from the emitter maintain the same phase as incoming signals on the base. The output of the emitter follower is fed to one input of two-input negative AND gate 90. The AND gate consists of diodes 88 and 89, resistor 91 and power supply 93. The cathodes of diodes 88 and 89 are connected together and kept at a negative potential by power supply 93. The second input of the AND gate, the anode of diode 89, is fed by the output of Channel B. Channel A imposes a negative voltage with respect to ground on the anode of diode 88 when tube 71 is conducting (no noise) and zero volts on the anode when tube 72 conducts (noise is present) in the channel. Terminals 92 are the output terminals of AND gate 90.

One of the most prevalent noise in a frequency modulation system and often one of the most annoying noises is impulse noise. Impulse noise can be defined as an unwanted signal having a steep wavefront. The amplitude of the signal is often larger than the amplitude of the desired signal. A common example of impulse noise is noise caused by an automotive ignition system. The interfering carrier from the ignition of an automobile can produce a received field intensity of one millivolt/meter on a dipole thirty feet high. In contradistinction, the received field intensity of the desired signal may only be one microvolt/meter on the same dipole.

In burst communication systems a transmission burst may have a duration lasting only milliseconds. A noise pulse could possibly be long enough to blank the entire burst. In the instance where the impulse noise generator is of the type like an automobile ignition system, a quick succession of noise pulses will be generated. If a transmission burst is sent out after the first noise pulse expires, the second or a later noise pulse may interfere with the burst.

Channel B is specifically adapted to sense one or more pulses of noise. In FIG. 2, Channel B is illustrated directly above Channel A and AND gate 90. All the signals amplified by tube 35 are fed to Channel B on lead 101. Capacitor 102 acts as a coupling capacitor and blocks out the D.-C. plate voltage on tube 35. The desired signal plus any noise signals will pass through capacitor 102. As the desired signal was originally a frequency modulated carrier with fixed frequency deviation the amplitude of the detected desired signal should remain constant. Double-ended Zener diode 103 is provided with an avalanche breakdown voltage in excess of the detected desired signal so that the desired signal will be blocked at the input to the diode. Zener diode 103 is connected to potentiometer 104 which functions as a level control for the input of electron tube 106. Impulse noise that causes Zener diode 103 to break down is amplified in tube 106. Tube 106 is coupled to tube 108 by means of Zener diode 107. The avalanche breakdown voltage of Zener diode 107 is low enough so that the breakdown condition continually occurs. Impulse noise signals amplified in tube 106 are coupled to tube 108 without attenuation through diode 107 and therein amplified. A full-wave rectifier circuit similar to that found in the plate circuit of tube 49 in Channel A is found in the plate circuit of tube 108. The rectifier includes transformer 122 and diodes 109. Degenerative feedback signals are fed to the cathode of tube 106 from the rectifier through resistor 119 and capacitor 121. The negative feedback improves the linearity and frequency response of the amplifier and reduces distortion. Unlike the diodes in the other rectifier, diodes 109 are oriented so that their cathodes are connected together. When the amplified impulse noise signals are rectified, point 114 assumes a positive voltage with respect to ground. Capacitors 111 and resistor 112 are connected in a pi-network and they function to smooth the output signals from the rectifier. Resistor 116 forms a discharge path for any charge accumulated on the capacitors. Double-ended Zener diode 113 is connected in shunt with resistor 112. The avalanche voltage of the diode is selected just above the white noise generated in the circuit. The Zener diode enables rectified impulse noise signals to bypass the smoothing filter and thus improves the response time of the circuit. The output of the filter is isolated from the next stage by means of tube 118 which functions as a cathode follower. The cathode follower is connected to the grid of electron tube 126 by means of resistor 124 and coupling capacitor 123. Diode 127, resistor 125 and capacitor 123 form a positive clamping circuit which sets the D.-C. level of the most negative part of the cathode follower output signals at zero volts. The clamped signals are amplified in tube 126. The anode of tube 126 is connected to the primary of iron-core transformer 128. The center tap of the secondary of transformer 128 is connected to potentiometer 133 and Zener diode 134. The extremities of the secondary are connected to the grids of push-pull amplifier tubes 136 and 137, respectively. This arrangement provides two output signals of equal amplitude and opposite polarity for driving push-pull amplifier tubes 136 and 137. Potentiometer 138 provides means for adjusting the cathode bias on the tubes. The anodes of tubes 136 and 137 are connected to the primary winding of iron-core transformer 139. A resistor 141 and a diode 142 are in shunt across the secondary winding of the transformer. The grid of electron tube 129 is connected to the output of Schmitt trigger 70 by means of lead 131. The binary output signals from the Schmitt trigger control the conduction of tube 129. When there is sufficient noise in Channel A to cut-off tube 71 of Schmitt trigger 70, the negative-going output pulse from Schmitt trigger 70, on lead 131, causes tube 129 to stop conducting. When the noise signals in Channel A subside and tube 71 starts conducting, the positive-going pulse from trigger 70, on lead 131, causes tube 129 to conduct. When tube 129 is not conducting, the potential on the wiper of potentiometer 133 and the potential on the center-tap of the secondary of transformer 128, is negative. This negative voltage keeps tubes 136 and 137 in cut-off condition. When tube 129 conducts, the center-tap voltage is clamped by Zener diode 134 and tubes 136 and 137 are enabled to conduct. The output voltages from tube 129 are not amplified by tubes 136 and 137 since they appear as in-phase signals on the grids of the tubes. The signals amplified by tubes 136 and 137 are those induced in the secondary winding from the primary winding and the amplification can only take place when tube 129 is conducting. Thus, it is apparent that tube 129 acts as a gate that only enables impulse signals to continue along Channel B when there is an absence of noise (sufficient to toggle Schmitt trigger 70) in Channel A.

Diode 142 shorts out negative signals in the output of the push-pull amplifier and only enables positive signals to reach the grid of tube 143. Tube 143 is used as a cathode follower to isolate the output of the push-pull amplifier from the adjustable integrating circuit comprising resistor 144, capacitor 147 and potentiometer 146. The time constant of the integrator is made adjustable by means of the latter. Diode 148 is a disconnect diode that couples only positive signals to the integrator. Integrated impulse noise signals are coupled directly to the grid of tube 151 which acts as a cathode follower to isolate the integrator from Schmitt trigger circuit 154. Potentiometer 152 in the cathode circuit of tube 151 enables the level of the cathode follower output signals to be adjusted before they are D.C. coupled to the Schmitt trigger circuit by means of resistor 155. In the absence of impulse noise at the output of tube 143, tube 157 of the Schmitt trigger 154 is conducting and tube 156 is cutoff. When impulse noise appears at the output of tube 143, tube 151 conducts more heavily and a positive-going pulse is produced at the wiper of potentiometer. When the triggering level of tube 156 is exceeded, tube 156 conducts, and tube 157 stops conducting. This action produces a positive-going signal at the anode of tube 157, the output of Schmitt trigger 154. Tube 156 continues conducting until the integrator (now discharging the charge on capacitor 147) enables the trigger input voltage to fall to or below the previous triggering voltage. Tube 156 then stops conducting and tube 157 comes out of cutoff. The discrepancy between the two triggering levels is known as voltage hysteresis or back lash of the circuit. It is made adjustable by means of potentiometer 160. When noise pulses entering Channel B attain a certain repetition rate, depending on the R-C constant of the integrator, capacitor 147 will continuously maintain a potential in excess of the triggering voltage of Schmitt trigger 70. Under these conditions the Schmitt circuit will not toggle with each individual noise pulse but will wait until the voltage on capacitor 147 drops below the triggering level when the pulse rate subsides. Obviously the potential on the capacitor will be also influenced by the amplitude of the noise pulses. The binary output signals of the Schmitt trigger are D.-C. coupled to tube 162. Potentiometer 161 is used as a level control of the signals. The cathode of tube 162 is connected to the anode of diode 89 which, as mentioned above, is part of AND gate 90. Tube 162 is used as a cathode follower to isolate the Schmitt trigger from the AND gate. Diode 163, in the cathode circuit of tube 162, bypasses to ground all positive signals. The output of the cathode follower is at ground potential when impulse noise triggers the Schmitt circuit and the output is a negative potential when the Schmitt assumes its alternate state. As was mentioned above, Channel A imposes a negative potential with respect to ground on the anode of diode 88 when tube 71 is conducting (no noise) and ground potential on the anode when tube 72 conducts (noise is present). The output of AND gate 90 is only negative if the signals from both Channel A and Channel B are negative. If either channel signal is zero volts the output of the AND gate will be zero volts. A zero-volt output signal from the AND gate indicates the presence of noise in one channel or the other. The noise in both channels has subsided when the output signal from the AND gate is negative. An indicator such as a meter or a neon bulb can be connected directly to the output of the AND gate, or the output signals can be used for switching purposes. For example, if the signals on lead 31 are to be recorded by a recorder (not shown) only when the signals have a good signal-to-noise ratio, and AND gate output voltage can be used to switch off the recorder when noise appears. In some communication systems it is desirable to halt all transmissions until a ready-to-receive signal is clearly received from the communicant. The output of AND gate 90 could be used to control the transmissions in such a system.

In Channel B the avalanche breakdown voltage of Zener diode 103 can be chosen and the setting of level-control potentiometer 152 can be adjusted so that any desired level of impulse noise will cause Schmitt circuit 154 to trigger. Similarly in Channel A, potentiometer 67 can be set so that any desired level of noise will trigger Schmitt circuit 70. Channel A can be adjusted, for example, in the following manner: connect a frequency-modulation signal generator to input terminal 31 and generate a frequency modulated signal of fixed-frequency deviation having an amplitude level and modulation frequency similar to that anticipated in actual operation; adjust potentiometer 67 so that tube 71 is on the verge of but not actually cut-off; disconnect the signal generator.

It will be understood that various changes in the details, materials, steps and arangements of parts, which have been here described and illustrated in order to explain the nature of the invention, may be made by those skilled in the art within the principle and scope of the invention as expressed in the appended claims.

What is claimed is:

1. A system for monitoring the output signals of a detector adapted to detect a frequency-modulated carrier having fixed-frequency deviation comprising, a high-pass filter having an input and an output, said filter input being adapted to couple to the output of said detector, a first rectifier having an input and an output, means for coupling said filter output to said input of said first rectifier, a first trigger circuit having an input and an output, means for connecting said trigger circuit input to said first rectifier output, an AND gate having two inputs, means for coupling said first trigger circuit output to one input of said AND gate, means for passing signals exceeding a predetermined amplitude, a second rectifier having an input and an output, said passing means having an input adapted to be coupled to said output of said detector and an output that is coupled to said input of said second rectifier, a second trigger circuit having an input and an output, means for coupling said second rectifier output to said input of said second trigger circuit, and means for coupling said output of said second trigger circuit to said second input of said AND gate.

2. An apparatus for monitoring unwanted signals in the output of a detector in a radio receiver adapted to receive a frequency-modulated carrier having fixed-frequency deviation comprising, means having an input and an output for detecting signals exceeding a predetermined amplitude, means having an input and an output for converting everyone of said detected signals to a binary-coded signal, means for coupling said input of said detecting means to the output of said detector, means for coupling said output of said detecting means to said input of said converting means, second detecting means having an input and an output for detecting signals exceeding a predetermined frequency, said second detecting means generating a binary-coded signal in accordance with the quantum and amplitude of signals having a frequency exceeding said predetermined frequency, means for coupling said second detecting means to the output of said detector, a two-input logic circuit, means for coupling said output of said first detecting means to one of said logic circuit inputs, and means for coupling said output of said second detecting means to said other logic circuit input.

3. Means for producing a binary-coded switching voltage indicative of the noise signals in the output of a frequency-modulation detector, comprising means having an input and an output for sensing signals exceeding a predetermined amplitude, said input of said sensing means being adapted to couple to said output of said detector, means having an input and an output for sensing signals higher than a predetermined frequency, said input of said sensing means being adapted to couple to said detector output, a first amplitude-sensitive means having an input and an output for producing binary-coded output signals, means for connecting said output of said first sensing means to said input of said first amplitude-sensitive means, a second amplitude-sensitive means having an input and an output for producing binary-coded output voltages, means for connecting said output of said second sensing means to said input of said second amplitude-sensitive means, an AND gate having a first input and a second input, means for connecting said output of said first amplitude-sensitive means to said first AND gate input, and means for connecting said output of said second amplitude-sensitive means to said second AND gate input.

4. A system for monitoring the output signals of a detector adapted to detect a frequency-modulated carrier having fixed-frequency deviation comprising, a high-pass filter having an input and an output, said input of said filter being adapted to couple to the output of said detector, a first rectifier having an input and an output, means for coupling said input of said first rectifier to said output of said high-pass filter, a first trigger circuit for generating binary-coded output signals, said first trigger circuit having an input and an output, an AND gate having a first input and a second input, means for coupling said output of said first trigger circuit to said first input, an amplitude-sensitive means having an input and an output for blocking signals below a predetermined amplitude and passing signals exceeding said predetermined level, said input of said amplitude-sensitive means being adapted to couple to the output of said detector, a second rectifier having an input and an output, means for coupling said input of said second rectifier to said output of said amplitude-sensitive means, a second trigger circuit for generating binary-coded output signals, said second trigger circuit having an input and an output, means coupled to said output of said second rectifier, said output of said first trigger circuit and said input of said second trigger circuit for gating signals from said output of said second rectifier, and means for coupling said output of said second trigger circuit to said second input of said AND gate.

5. A system for detecting undesired signals in the output of a frequency-modulation detector wherein the desired signal, when present, is a frequency-modulated carrier with fixed-frequency deviation comprising, a high-pass filter having an input and an output, said filter input being adapted to couple to said detector, means connected to said filter output for rectifying the output signals from said filter, a first trigger circuit having an input and an output, means for coupling said rectified signals to said trigger circuit input, said trigger circuit producing a first output voltage when said rectified signals exceed a first trigger voltage and said trigger circuit producing a second output voltage when said rectified signals drop below a second trigger voltage, an AND gate having a first input and a second input, means for coupling said first trigger circuit output voltages to said first AND gate input, amplitude sensitive means for passing impulse noise signals, said passing means having an input and an output, said passing means input being adapted to couple to said frequency-modulation detector, means for rectifying impulse noise signals, said last means being coupled to said passing means, an integrator having an input and an output, means coupled to the impulse rectifying means, said first trigger circuit output, and said integrator input for gating signals from said second rectifying means to said integrator, a second trigger circuit having an input and an output, means for coupling said integrator output to said second trigger circuit input, and means for coupling said second trigger circuit output to said second input of said AND gate.

6. Means for producing a binary-coded switching voltage indicative of the noise signals in the output of a frequency-modulation detector comprising, means for detecting heterogeneous noise signals, said detecting means comprising: means for passing signals having a frequency higher than a predetermined frequency, a rectifier, means for connecting said signal-passing means to said rectifier, a trigger circuit, and means for connecting said rectifier to said trigger circuit; means for coupling said passing means to said detector, second detecting means for detecting impulse noise signals, means, including said coupling means, for coupling said second detecting means to said detector, a logic circuit having a first input and a second input, means for connecting said trigger circuit to said first input, and means for connecting said second detecting means to said second input.

7. Means for producing a binary-coded switching voltage indicative of the noise signals mixed with a desired signal in the output of a frequency-modulation detector comprising, means for detecting heterogeneous noise signals, said detecting means comprising; means having an input and an output for passing signals exceeding a predetermined frequency and means having an input and output for generating a binary-coded voltage in accordance with the number and amplitude of signals which have a frequency exceeding said predetermined frequency, and means for coupling said output of said passing means to said input of the binary voltage generating means; means for coupling said input of said passing means to said output of said frequency-modulation detector; means having an input and an output for detecting impulse noise signals, means for coupling said input of the impulse detecting means to the output of said frequency-modulation detector; a logic circuit having a first input and a second input, means for connecting said output of the binary voltage generating means to said first input, and means for connecting said output of said impulse detecting means to said second input, said impulse detecting means having an input and an output comprising amplitude-sensitive means for passing signals exceeding a fixed amplitude and blocking signals below said fixed amplitude, a rectifier having an input and an output, means for connecting said output of said amplitude-sensitive means to said input of said rectifier, a trigger circuit having an input and an output, and means for connecting said output of said rectifier to said input of said trigger circuit, said input of said amplitude-sensitive means being coupled to the output of said impulse detector, and the output of said trigger circuit being connected to said second logic circuit input.

References Cited in the file of this patent
UNITED STATES PATENTS

| | | |
|---|---|---|
| 2,152,515 | Wheeler | Mar. 28, 1939 |
| 2,489,254 | Arnold et al. | Nov. 29, 1949 |
| 2,703,364 | Birnbaum | Mar. 1, 1955 |
| 2,946,010 | Tarczy-Hornoch | July 19, 1960 |